(12) United States Patent
Heffron et al.

(10) Patent No.: US 10,513,242 B1
(45) Date of Patent: Dec. 24, 2019

(54) VIOLATION ENFORCEMENT SYSTEM

(71) Applicant: ITSA Solutions LLC, Midland Park, NJ (US)

(72) Inventors: Colin Heffron, New York, NY (US); Kevin Dougherty, Weston, CT (US); Robert White, Bloomingdale, NJ (US); Colin Heffron, Jr., New York, NY (US); Christopher C. D'Antuono, Atlantic Highlands, NJ (US); Francis J. Pinero, Iowa City, IA (US); Amilcar Sergio Penetra, Florham Park, NJ (US)

(73) Assignee: ITSA Solutions LLC, Midland Park, NJ (US)

( * ) Notice: Subject to any disclaimer, the term of this patent is extended or adjusted under 35 U.S.C. 154(b) by 0 days.

(21) Appl. No.: 16/014,378

(22) Filed: Jun. 21, 2018

Related U.S. Application Data

(60) Provisional application No. 62/680,234, filed on Jun. 4, 2018.

(51) Int. Cl.
| | | |
|---|---|---|
| *B60R 25/00* | (2013.01) | |
| *B60R 25/01* | (2013.01) | |
| *B60R 25/33* | (2013.01) | |
| *F16B 47/00* | (2006.01) | |
| *B60J 1/06* | (2006.01) | |

(Continued)

(52) U.S. Cl.
CPC ............... *B60R 25/016* (2013.01); *B60J 1/06* (2013.01); *B60R 25/00* (2013.01); *B60R 25/01* (2013.01); *B60R 25/1004* (2013.01); *B60R 25/33* (2013.01); *F16B 47/00* (2013.01); *H04W 4/029* (2018.02)

(58) Field of Classification Search
CPC ....... B60R 25/00; B60R 25/01; B60R 25/016; F16B 47/00
See application file for complete search history.

(56) References Cited

U.S. PATENT DOCUMENTS

| 7,114,651 B2 | 10/2006 | Hjelmvik |
| 7,427,094 B2 | 9/2008 | Marks et al. |

(Continued)

FOREIGN PATENT DOCUMENTS

| CN | 102881184 A | 1/2013 |
| EP | 1562801 B1 | 8/2006 |
| GB | 2395178 B | 11/2005 |

*Primary Examiner* — Andrew W Bee
(74) *Attorney, Agent, or Firm* — MacMillan, Sobanski & Todd, LLC

(57) ABSTRACT

A violation enforcement system configured to impair the view of a driver through a windshield of a vehicle is provided. The violation enforcement system includes a plurality of covering assemblies. Each of the covering assemblies has one or more suction assemblies configured for placement against a windshield of a vehicle. A pump assembly is configured for pneumatic communication with the one or more suction assemblies. The pump assembly is configured to develop a partial vacuum between the suction assemblies and the windshield. A release assembly is configured for pneumatic communication with the one or more suction assemblies. The release assembly is further configured to actuate release of the suction assemblies from the windshield. A GSM module is configured to receive information from GPS satellites and then calculate the geographical position of the violation enforcement system.

11 Claims, 6 Drawing Sheets

(51) Int. Cl.
*H04W 4/029* (2018.01)
*B60R 25/10* (2013.01)

(56) References Cited

U.S. PATENT DOCUMENTS

| | | | |
|---|---|---|---|
| 7,950,570 | B2 | 5/2011 | Marchasin et al. |
| 7,988,046 | B2 | 8/2011 | Moynihan et al. |
| 9,156,436 | B2 | 10/2015 | Hopper et al. |
| 9,623,838 | B1 | 4/2017 | Perri |
| 2004/0068433 | A1 | 4/2004 | Chatterjee et al. |
| 2006/0151987 | A1* | 7/2006 | Marks ................ B60R 25/016 280/848 |
| 2007/0085704 | A1 | 4/2007 | Long |
| 2009/0289814 | A1* | 11/2009 | Jarman ................ G07B 15/02 340/933 |
| 2014/0210646 | A1 | 7/2014 | Subramanya |
| 2017/0124608 | A1 | 5/2017 | Silverman |
| 2017/0124774 | A1 | 5/2017 | Silverman |
| 2018/0077211 | A1* | 3/2018 | Rose ................ H04L 65/4069 |

\* cited by examiner

VIOLATION ENFORCEMENT SYSTEM

BACKGROUND

Wheel clamp devices are in common use today for dealing with improperly parked vehicles, parking violation issues and/or other vehicle related violation issues, such as for example failure to pay car payments. Wheel clamp devices are typically attached to the wheel of a parked vehicle by a wheel clamp operative, so as to prevent the owner of the vehicle from driving the vehicle away or moving the vehicle.

At the same time as deploying the wheel clamp device on the improperly parked vehicle, the wheel clamp operative will usually display a notice in the window of the vehicle informing the owner that the vehicle is improperly parked and that the wheel clamp device will remain on the vehicle until such a time as applicable fees are paid. When the owner of the vehicle has contacted the appropriate authorities and paid the requisite fees, the wheel clamp operative is instructed to return to the vehicle to remove the wheel clamp device, after which the owner of the vehicle is free to move the vehicle.

One problem with existing wheel clamp devices is that, in order to be effective in preventing movement of the vehicle as well as strong and secure enough to prevent unauthorized removal of the wheel clamp device (by means of force or otherwise), the wheel clamp devices tend to be bulky and heavy. Furthermore, the complexity of many wheel clamp devices makes successful and secure deployment difficult to achieve for an inexperienced wheel clamp operative. In other instances, the wheel clamp operative can be forced to work in the flow of oncoming traffic in the event of deploying a wheel clamp device on a vehicle that is parked flush to an obstacle on one side of the vehicle, such as for example a curb. In still other instances, wheel clamp devices can be ineffective against large-wheeled vehicles such as trucks and buses.

It would be advantageous if violation enforcement systems could be improved.

SUMMARY

It should be appreciated that this Summary is, provided to introduce a selection of concepts in a simplified form, the concepts being further described below in the Detailed Description. This Summary is not intended to identify key features or essential features of this disclosure, nor is it intended to limit the scope of the violation enforcement system.

The above objects as well as other objects not specifically enumerated are achieved by a violation enforcement system configured to impair the view of a driver through a windshield of a vehicle. The violation enforcement system includes a plurality of covering assemblies. Each of the covering assemblies has one or more suction assemblies configured for placement against a windshield of a vehicle. A pump assembly is configured for pneumatic communication with the one or more suction assemblies. The pump assembly is configured to develop a partial vacuum between the suction assemblies and the windshield. A release assembly is configured for pneumatic communication with the one or more suction assemblies. The release assembly is further configured to actuate release of the suction assemblies from the windshield. A GSM module is configured to receive information from GPS satellites and then calculate the geographical position of the violation enforcement system.

The above objects as well as other objects not specifically enumerated are also achieved by a violation enforcement system configured to impair the view of a driver through a windshield of a vehicle. The violation enforcement system includes a plurality of covering assemblies. Each of the covering assemblies has one or more suction assemblies configured for placement against a windshield of a vehicle. A pump assembly is configured for pneumatic communication with the one or more suction assemblies. The pump assembly is configured to develop a partial vacuum between the suction assemblies and the windshield. A release assembly is configured for pneumatic communication with the one or more suction assemblies. The release assembly is configured to actuate release of the suction assemblies from the windshield. A sensor system is configured to sense environmental conditions for adjustment of the partial vacuum developed between the suction assemblies and the windshield.

Various objects and advantages of the violation enforcement system will become apparent to those skilled in the art from the following detailed description, when read in light of the accompanying drawings.

DETAILED DESCRIPTION OF THE INVENTION

The violation enforcement system will now be described with occasional reference to the specific embodiments. The violation enforcement system may, however, be embodied in different forms and should not be construed as limited to the embodiments set forth herein. Rather, these embodiments are provided so that this disclosure will be thorough and complete, and will fully convey the scope of the violation enforcement system to those skilled in the art.

Unless otherwise defined, all technical and scientific terms used herein have the same meaning as commonly understood by one of ordinary skill in the art to which the violation enforcement system belongs. The terminology used in the description of the violation enforcement system herein is for describing particular embodiments only and is not intended to be limiting. As used in the description of the violation enforcement system and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the violation enforcement system. Notwithstanding that the numerical ranges and parameters setting forth the broad scope of the violation enforcement system are approximations, the numerical values set forth in the specific examples are reported as precisely as possible. Any numerical values, however, inherently contain certain errors necessarily resulting from error found in their respective measurements.

In accordance with embodiments of the present invention, a violation enforcement system is provided. Generally, the violation enforcement system is secured to a windshield of a vehicle through suction formed by one or more suction assemblies. The violation enforcement system is removed from the windshield after a user input release code matches a stored release code and after a servomotor actuates release of the suction between the suction assemblies and the windshield. In the alternative, the suction between the suction assemblies and the windshield can be released by actuation of a release valve lock assembly.

The term "suction", as used herein, is defined to mean any force that, by a pressure differential, attracts an object to the region of lower pressure.

Figure 1:
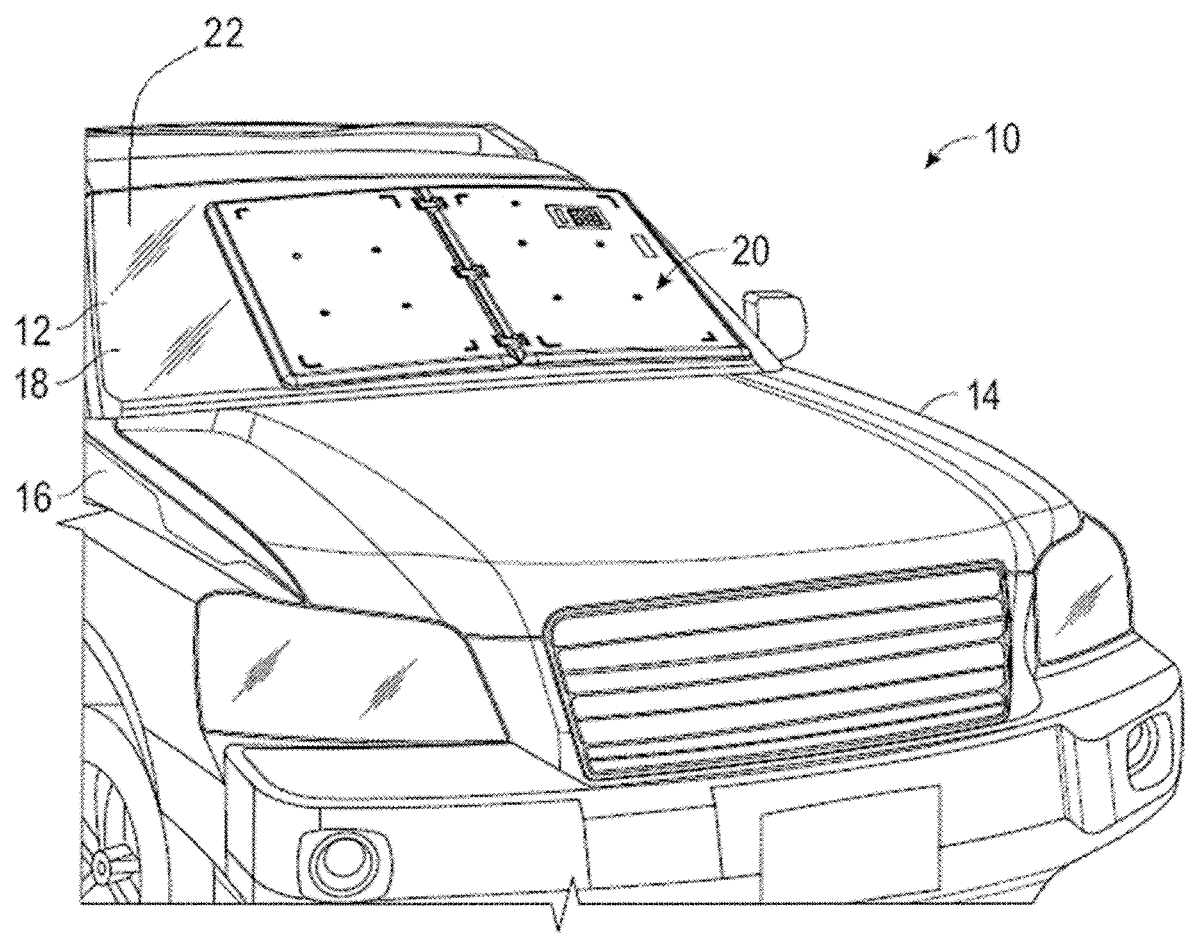
FIG. 1 is a simplified, perspective view of a vehicle equipped with a deployed violation enforcement system.

Referring now to the drawings, there is illustrated in FIG. 1 a diagrammatic and simplified view of a vehicle 10. The vehicle 10 is conventional in the art and includes a passenger compartment 12, configured for a driver (not shown) and optional passengers (not shown). The passenger compartment 12 is equipped with vehicle controls (not shown) including a steering mechanism, acceleration and braking devices. The steering mechanism, acceleration and braking devices are conventional in the art. When viewed from the driver's position within the passenger compartment 12, the vehicle 10 has a vehicle left side 14 and a vehicle right side 16. In the illustrated embodiment, the driver and the vehicle controls are positioned on the left side of the passenger compartment 12. However, in other embodiments, the driver and the vehicle controls can be positioned in other locations of the passenger compartment 12.

Referring again to FIG. 1, the vehicle 10 includes a windshield 18. The windshield 18 is configured to protect the occupants of the passenger compartment 12 during use of the vehicle 10 and further configured to provide the driver with a view of a path in front of the vehicle 10. The windshield 18 can have any desired construction, including the non-limiting example of a laminated construction and can have any desired shape, size and configuration, including the non-limiting examples of flat or curved surfaces.

Referring again to FIG. 1, the vehicle 10 is equipped with a violation enforcement system 20 (hereafter "system"). The system 20 is configured for attachment to an exterior surface 22 of the windshield 18. Generally, in an installed position, the system 20 is further configured to impair the view of the driver through the windshield 18, such as to make it difficult for the driver to view the path in front of the vehicle 10.

Figure 2:
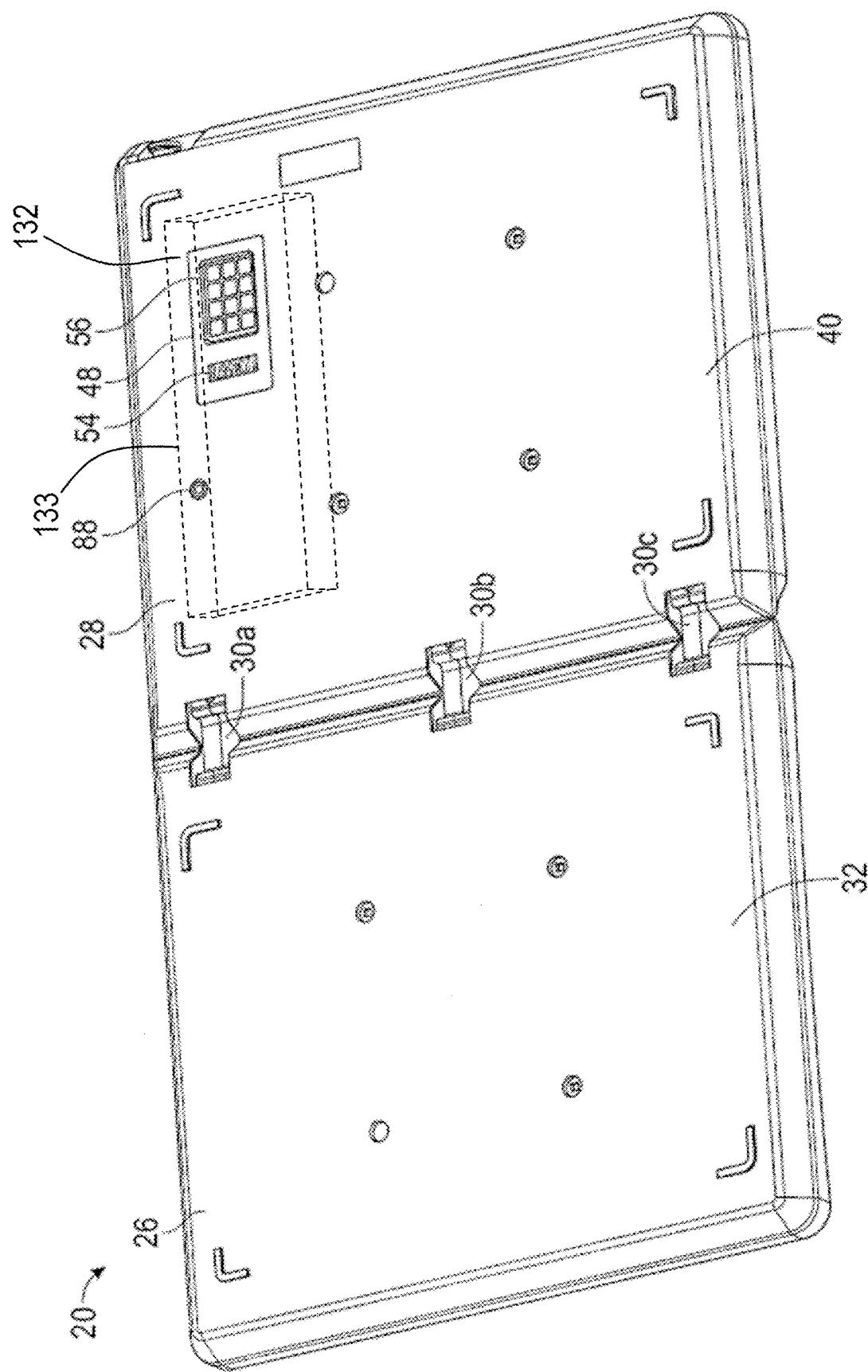
FIG. 2 is a top perspective view of the violation enforcement system of FIG. 1.
Figure 3:
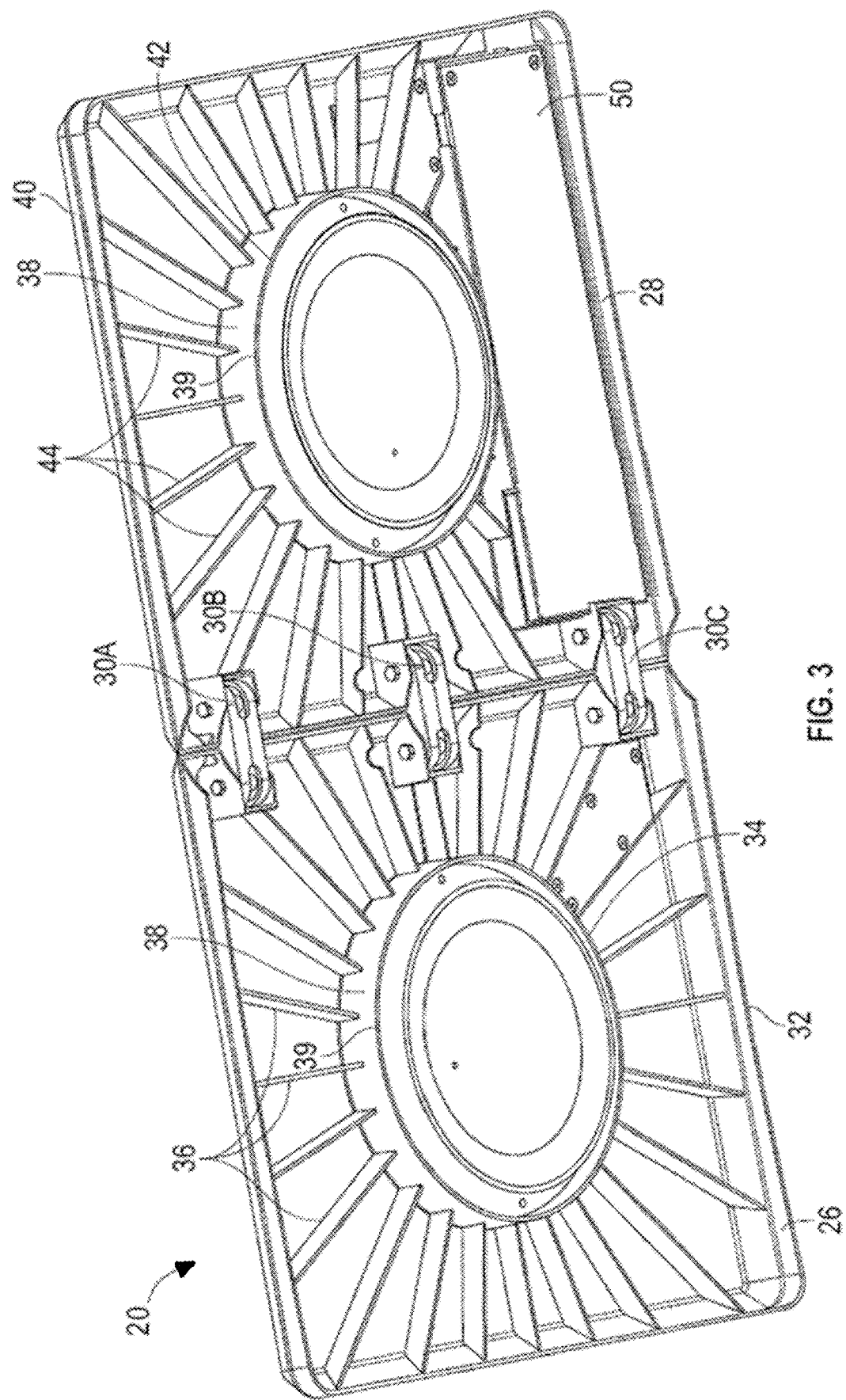
FIG. 3 is a bottom perspective view of the violation enforcement system of FIG. 1.

Referring now to FIGS. 2 and 3, the system 20 is illustrated. The system 20 includes a first covering assembly 26 connected to a second covering assembly 28 by a plurality of connector links 30A-30C. The system 20 is illustrated in FIGS. 2 and 3 in a deployed arrangement, that is, in the arrangement as installed on the exterior surface 22 of the windshield 18 as shown in FIG. 1. As will be discussed in more detail below, the connector links 30A-30C are configured to facilitate folding of the first and second covering assemblies 26, 28 into a stowed arrangement.

Referring again to FIGS. 2 and 3, the first covering assembly 26 includes an outer shell 32 configured to enclose and support a first suction assembly 34, positioned on an underside of the outer shell 32. Referring now to FIG. 3, optionally, the outer shell 32 can include a plurality of first assembly gussets 36 configured to support the first suction assembly 34. In the illustrated embodiment, the first assembly gussets 36 have a radial orientation. Alternatively, the first assembly gussets 36 can have other orientations, such as the non-limiting example of a circumferential orientation. However, it should be appreciated that the first assembly gussets 36 are optional and not required for operation of the system 20.

Referring again to FIGS. 2 and 3, the second covering assembly 28 includes an outer shell 40 configured to enclose and support a second suction assembly 42, positioned on an underside of the outer shell 40. Referring now to FIG. 3, optionally, the outer shell 40 can include a plurality of second assembly gussets 44 configured to support the second suction assembly 42. In the illustrated embodiment, the second assembly gussets 44 have a radial orientation. Alternatively, the second assembly gussets 44 can have other orientations, such as the non-limiting example of a circumferential orientation. However, it should be appreciated that the second assembly gussets 44 are optional and not required for operation of the system 20.

Referring now to FIG. 3, each of the first and second covering assemblies 26, 28 includes a support ring 38. The support rings 38 extend from the outer shells 32, 40 to rims 39. With the system 20 in a deployed arrangement, the rims 39 are configured for contact with the windshield 18. In this orientation, the support rings 38 are configured as tamper resistant structures, that is, the support rings 38 are configured to prevent engagement of the first and second suction assemblies 34, 42 by a mechanism or device extending under the first and second covering assemblies 26, 28, for purposes of relieving the partial vacuum formed in the first and second suction assemblies 34, 42. In the illustrated embodiment, the support rings 38 and the rims 39 have a circular cross-sectional shape that extend circumferentially around the suction assemblies 34, 42. However, in other embodiments, the support rings 38 and the rims 39 can have other cross-sectional shapes sufficient to form tamper resistant structures to prevent engagement of the first and second suction assemblies 34, 42.

Figure 4:
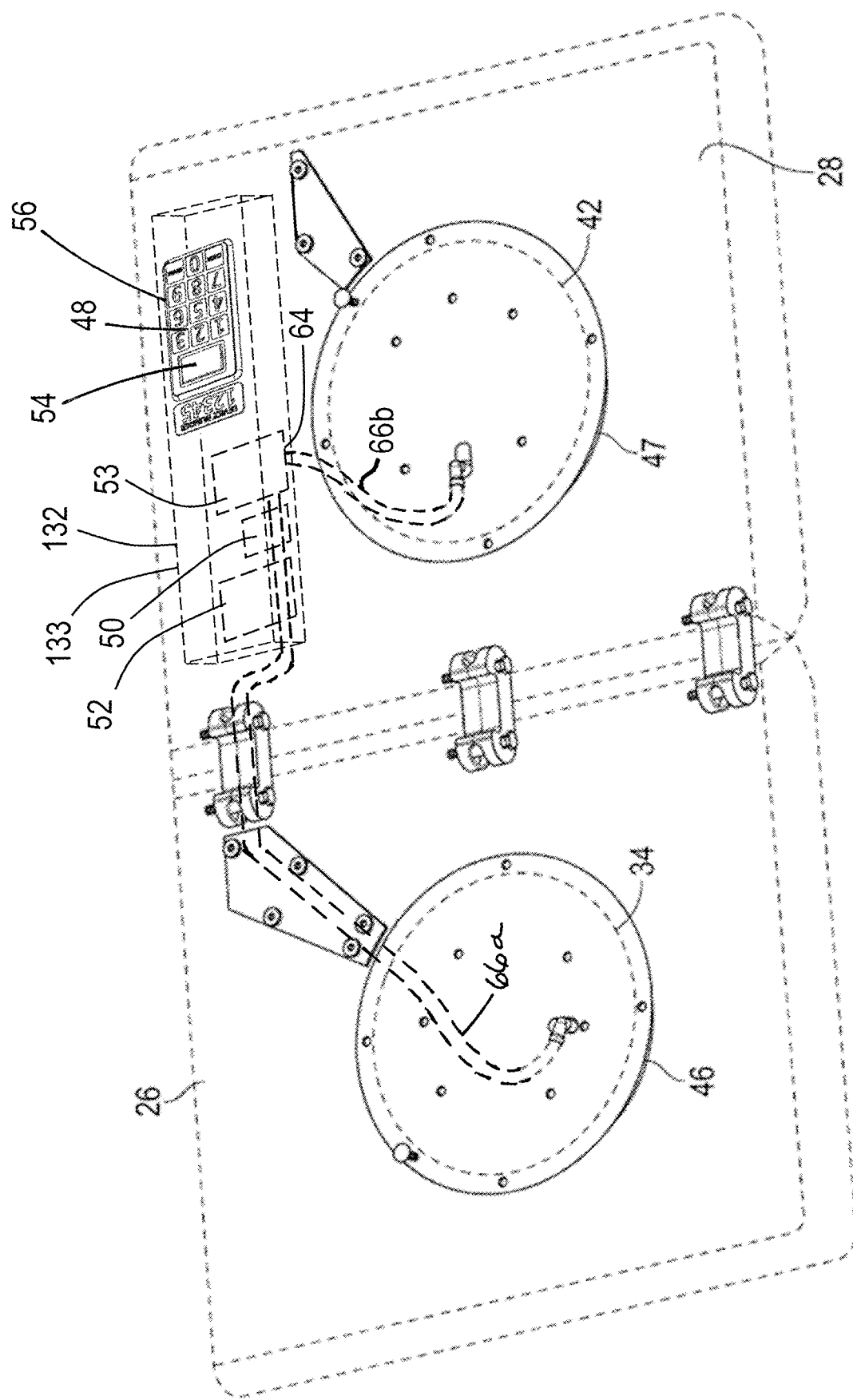
FIG. 4 is a top perspective view of the violation enforcement system of FIG. 1 shown with the outer shells in phantom.

Referring now to FIG. 4, the first covering assembly 26 includes a first plate 46 concentrically positioned between the outer shell 32 and the first suction assembly 34. The first plate 46 is configured as a tamper resistant structure, that is, the first plate 46 is configured to prevent engagement of the first and second suction assemblies 34, 42 by a mechanism or device extending through the outer shells 32, 40 of the first and second covering assemblies 26, 28, for purposes of relieving the partial vacuum formed in the first and second suction assemblies 34, 42. In the illustrated embodiment, the first plate 46 has a circular cross-sectional shape that extends circumferentially around the suction assemblies 34, 42. However, in other embodiments, the first plate 46 can have other cross-sectional shapes sufficient to form a tamper resistant structure to prevent engagement of the first and second suction assemblies 34, 42. In a similar manner, the second covering assembly includes a second plate 47. In the illustrated embodiment, the second plate 47 is the same as, or similar to, the first plate 46 described above and illustrated in FIG. 4. However, it should be appreciated that the second plate 47 can be different from the first plate 46.

Figure 5:
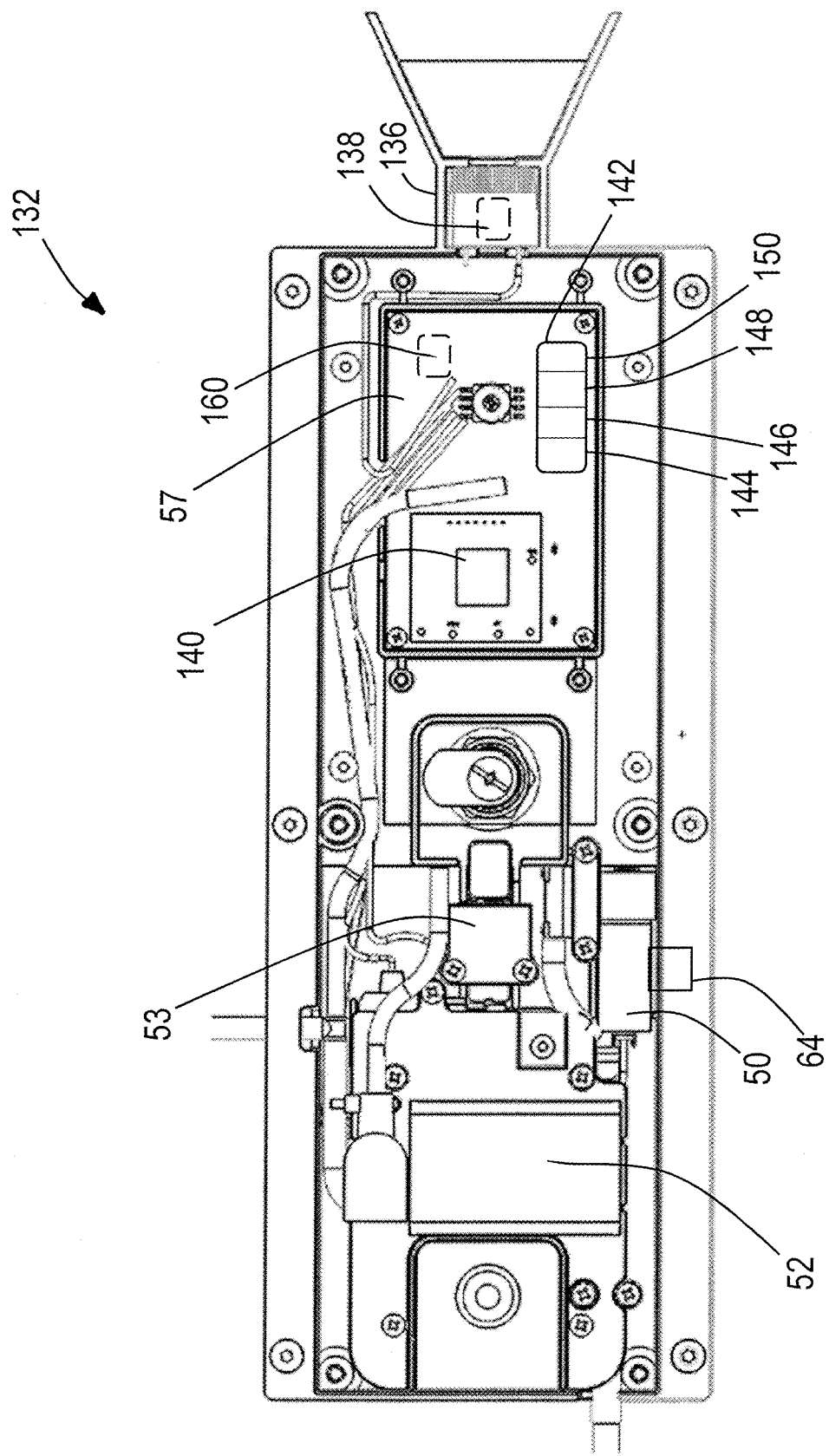
FIG. 5 is a plan view of a control module of the violation enforcement system of FIG. 4.

Referring now to FIGS. 2, 4 and 5, the second covering assembly 28 includes a control module 132. The control module 132 includes a housing 133 configured to enclose components and assemblies used to control operation of the system 20. The control module 132 includes an input assembly 48, a pump assembly 50, a power supply assembly 52 and a suction release assembly 53. The input assembly 48 includes a display device 54, an input device 56, a control circuit board shown 57 and a memory device (not shown). Generally, the input device 56 is configured for entry of a user-provided release code. In the illustrated embodiment, the input device 56 is an electronic keypad. One non-limiting example of a suitable input device 56 is the Membrane 3×4 Matrix Keypad, Model 419, manufactured by Adafruit Industries LLC, headquartered in New York City. However, in other embodiments, the input device 56 can be other structures, mechanisms and devices sufficient for entry of a user-provided release code, such as the non-limiting examples of numeric pads, touch screens and the like.

Referring again to FIGS. 2, 4 and 5, the display device 54 is in electrical communication with the input device 56 and is configured to illustrate the release code input by the user. In the illustrated embodiment, the display device 54 is an LCD-type type of screen configured to operation with low power requirements. One non-limiting example of a suitable display device 54 is the Lumex model LCD-S401C39TR, manufactured by Lumex Inc, headquartered in Carol Stream, Ill., 60188. While the embodiment of the display device 54 shown in FIGS. 2, 4 and 5 is described as an LCD-type of display, it should be appreciated that other display devices, sufficient to illustrate the release code input by the user, can be used.

Referring again to FIGS. 2, 4 and 5 and as will be discussed in more detail below, the memory device (not shown) is configured to store a previously provided system release code. The memory device can be any structure, mechanism or device sufficient to store a previously provided system release code, including the non-limiting example of a random access memory device.

Referring again to FIGS. 2, 4 and 5, the control circuit board 57 is in electrical communication with the input device 56 and the memory device and is configured to compare the user-entered release code with the system release code stored in the memory device. In the event the user-entered release code matches the system release code stored in the memory device, the control circuit board 57 is configured to initiate release of the system 20 from the windshield 18 of the vehicle 10. In the illustrated embodiment, the control circuit board 57 has the form of a microprocessor-based printed circuit board, containing software or code sufficient to compare the user-entered release code with the system release code. However, in other embodiments, the control circuit board 57 can have other desired forms, sufficient for the functions described above.

Referring again to FIG. 4, the power supply assembly 52 is configured for several functions. First, the power supply assembly 52 is configured to provide electrical power to the display device 54, the keyboard 56, the control circuit board 57 and the memory device. Second, the power supply assembly 52 is configured to provide electrical power to the suction release assembly 53 in order to initiate release of the system 20 from the windshield 18 of the vehicle 10. In the illustrated embodiment, the power supply assembly 52 includes a plurality of size AA batteries (not shown). However, in other embodiments, the power supply assembly 52 can have other desired forms, including the non-limiting examples of rechargeable batteries or an external power source (not shown). In still other embodiments, it is within the contemplation of the system 20 that the battery or batteries within the power supply assembly 52 can be charged by a plurality of solar cells (not shown) positioned within the system 20. The power supply assembly 52 can provide electrical power in any desired form, voltage or amperage sufficient to power the operations of the system 20.

Referring now to FIGS. 4 and 5, the pump assembly 50 is configured to produce a partial vacuum in the first and second suction assemblies 34, 42 and is in fluid communication with the pneumatic hoses 66a, 66b an inlet port 64. The inlet port 64 is pneumatically connected to the first suction assembly 34 via pneumatic hose 66a and connected to the second suction assembly 42 via pneumatic hose 66b. The suction release assembly 53 is in fluid communication with the first and second suction assemblies 34, 42 via pneumatic hoses 66a, 66b and is configured to release the suction formed between the first and second suction assemblies 34, 42 and the exterior surface 22 of the windshield 18. Non-limiting examples of a suitable pump assembly 50 and a suction release assembly 53 can be found in pending PCT patent application no. PCT/US16/44364, filed Jul. 28, 2016 and titled "Parking Enforcement System". However, it should be appreciated that other suitable structures, mechanisms and devices can be used, sufficient for the functions described herein. While the embodiment shown in FIG. 4 illustrates a certain routing of the pneumatic hoses 66a, 66b within the first and second covering assemblies 26, 28, it should be appreciated that the pneumatic hoses 66a, 66b can have other routings within the first and second covering assemblies 26, 28, sufficient to pneumatically connect the inlet port 64 to the first and second suction assemblies 34, 42.

Referring again to FIG. 3, the first and second suction assemblies 34, 42 are illustrated. The first and second suction assemblies 34, 42 include a flexible rubber suction cup (such flexible rubber suction cup are commonly used in the glazing industry for the moving of panes of glass). One non-limiting example of a suitable suction assembly is the suction assembly of the type disclosed in U.S. Pat. No. 7,427,094 to Marks et al., which is hereby incorporated by reference, in its entirety. However, other suction assemblies, sufficient to secure the system 20 to the exterior surface 18 of the windshield 12 can be used.

Referring again to FIG. 3, while the illustrated embodiment shows a quantity of one suction assembly for each covering assembly 26, 28, it is within the contemplation of this disclosure that each covering assembly 26, 28 can be equipped with more than one suction assembly.

Figure 6:
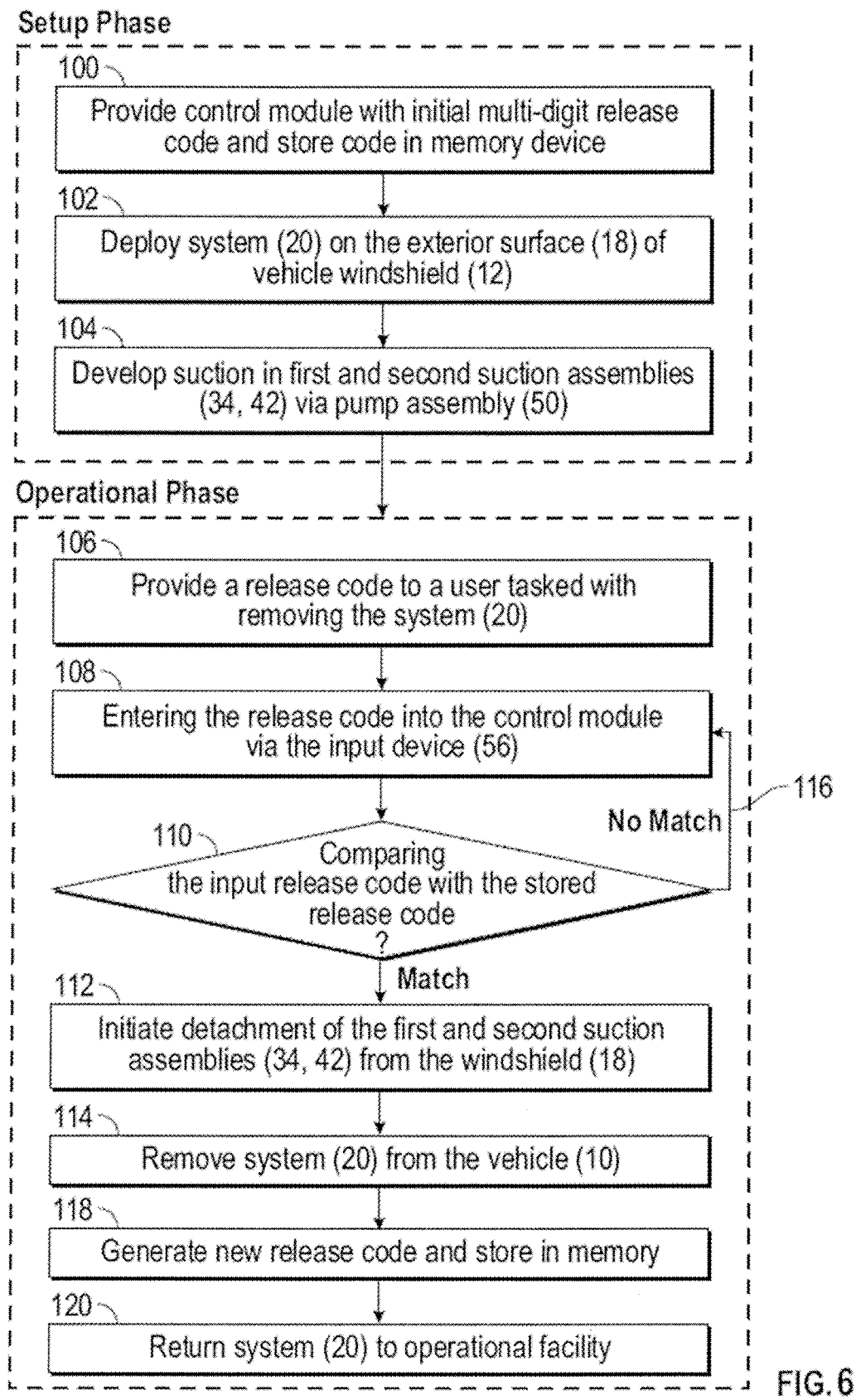
FIG. 6 is a flow chart illustrating steps in the setup and operation of the violation enforcement system of FIG. 1.

Referring now to FIG. 6, the setup and operation of the system 20 will be described. In an initial setup step 100, an initial multi-digit release code is input into the control circuit board 57 with the input device 56. The initial multi-digit release code is stored in the memory device and continuously displayed on the display device 54. As will be discussed in more detail below, the initial multi-digit release code is used to identify the specific system 20. In a next setup step 102, the system 20 is deployed on the exterior surface 18 of vehicle windshield 12. In this step, the first and second suction assemblies 34, 42 are without suction, that is, the components within the system 20 are at atmospheric pressure. In a final setup step 104, the system 20 is secured to the exterior surface 18 of the vehicle windshield 12 by developing suction in the first and second suction assemblies 34, 42. The suction is developed by the pump assembly 50 and conveyed to the first and second suction assemblies via the pneumatic hoses 66a, 66b.

Referring again to FIG. 6 in a first operational step 106, in the event it is desired to remove the system 20, a user tasked with removing the system 20 notes the initial multi-digit release code displayed on the display device 54. Using the initial multi-digit release code as a system identifier, the user obtains a release code from an operational facility. After proper authorization, the release code can be provided to the user via different manners, including the non-limiting examples of a payment receipt, e-mail, text message and the like. It is also within the contemplation of the system 20, that the user can obtain the release code via an internet-based application (web app) or a mobile application. By providing the release code directly to the user, the release code is not provided to the display device 54, input device 56, control circuit board 57 or memory device. In a next operational step 108, the user enters the release code into the control circuit board 57 via the input device 56. Optionally, the user can view the input release code via the display device 54, although such is not necessary for operation of the system 20. In a next operational step 110, the control circuit board 57 compares the input release code with the stored release code. In a next operation step 112, upon a match of the input release code with the stored release code, detachment of the system 20 from the windshield 18 is initiated. This step includes the action of removing the suction formed between the first and second suction assemblies 34, 42 and the exterior surface 18 of the windshield using the suction release assembly 53. In a next operational step 114, the system 20 is removed from the vehicle 10.

Referring again to FIG. 6 and operation step 110, in the event the input release code does not match the stored release code, in a next step 116, the user is returned to operational step 110 to re-input the release code.

In a next operational step 118, once the control circuit board 57 determines a match between the input release code and the stored release code, and the system 20 is removed from the windshield 18, the control module 57 is configured to generate a new release code that is stored in the memory device. The newly generated release code supersedes the previously stored release code. The system 20 is then ready for a new deployment.

In a final step 120, the user returns the system 20 to an operational facility. It is contemplated that the user may have a defined time in which to return the system 20 to the operational facility. For example, it is contemplated that the user may have a time limit of 24.0 hours in which to make the return. In the event, the system 20 is not returned, the user may be assessed penalties, such as the non-limiting example of further financial charges.

Referring again to FIG. 5, the control module 132 can include an alarm assembly 136. The alarm assembly 136 is configured to sense movement and/or vibration of a deployed system 20 and further configured to provide audio notification of the movement and/or vibration. In the illustrated embodiment, the alarm assembly 136 includes an accelerometer, shown schematically at 138, configured to sense movement and/or vibration of the deployed system 20. However, in other embodiments, other structures, mechanisms and devices can be used sufficient to sense movement and/or vibration of a deployed system 20 and provide audio notification of the movement and/or vibration. In certain embodiments, the alarm assembly 136 can include a visual and/or audio indicator (not shown). The visual and/or audio indicator can be configured to provide continuous visual and/or indications of movement and/or vibration of the system 20. Non-limiting examples of visual indicators include a flashing strobe-style of light, flashing colored lights and interrupted beams of light formed by one or more lasers. Non-limiting examples of audio indicators include beeping sounds, alarms, sirens and the like. The beeping sound can have any desired and suitable tone, pulse and volume.

Referring again to FIG. 5, the control module 132 is configured for other functions. As a first non-limiting example, the control module 132 includes a GSM module 140. The GSM module 140 is configured for interaction with the Global System for Mobile communications (commonly referred to as "GSM"). GSM provides a second generation digital cellular network.

Referring again to FIG. 5, the GSM module 140 is configured to receive information from GPS satellites and then calculate the geographical position of the system 20. The control circuit board 57 is further configured with suitable software to advantageously provide latitude and longitude coordinates of the system 20 to a remote, central computer-based system (not shown). The remote, central computer-based system can include one or more servers and associated hardware and is configured to enable web-based management of one or more systems 20. The advantages of the web-based management protocol will be discussed in more detail below.

In the embodiment illustrated in FIG. 5, the control module 132 and the GSM module 140 are configured with assisted GPS technology (also known as A-GPS), which can use a base station or cell towers to provide the system 20 with location tracking capability, especially when GPS signals are poor or unavailable. However, it should be appreciated that use of A-GPS technology is not necessary for the GPS function. It should also be appreciated that in other embodiments, the system 20 can be configured in a manner such that other satellite-based navigation systems can be used, including the non-limiting example of the "Global Navigation Satellite System" (also known as "GLONASS").

Advantageously, the use of global positioning systems allows determination of the precise geographical location a system 20 and further allows determination of movement of a system 20.

It should be appreciated that the real-time geographical locations of a plurality of systems 20 could be simultaneously combined and shown on a display or electronic device. The combined information showing the real-time geographical locations of more than one system 20 advantageously facilitates development of an inspection route, whereby the plurality of systems 20 can be efficiently viewed for condition, damage, expiration and the like. It is further contemplated that the combined information show showing the real-time geographical locations of more than one system 20 advantageously facilitates analysis of patterns in parking behaviors over a given area. As one non-limiting example, the analysis can be used to direct an inspector to parking areas where there are more likely to be violations, thereby avoiding parking areas where, based on patterns, vehicle user behaviors are likely to have improved due to use of the system 20.

It is further contemplated that the GSM module 140 can be configured for other functions in addition to the positioning function. As one non-limiting example, the GSM module 140 can be configured to receive a "kill" signal. The term "kill signal", as used herein, is defined to mean an electronic signal configured to render the system 20 inoperative. It is contemplated that the system 20 can be made inoperative as a result of misuse by a user, such as the non-limiting examples of physical damage, a failure to pay or misappropriation. By rendering the system 20 inoperative, the partial vacuum formed between the first and second suction assemblies 34, 42 and the windshield 18 is removed, thereby allowing atmospheric pressure to develop between the first and second suction assemblies 34, 42 and the windshield 18. With the introduction of the atmospheric pressure, advantageously the system 20 can be readily removed from the windshield without the use of release codes. In the illustrated embodiment, the kill signal is configured as software and directs operation of the suction release assembly 53. However, in other embodiments, the kill signal can be configured to direct operation of other systems and assemblies sufficient to remove the partial vacuum formed between the first and second suction assemblies 34, 42 and the windshield 18.

Referring again to FIG. 5, as another non-limiting example, the GSM module 140 can be configured to receive software and/or code updates for the control circuit board 57. Advantageously, the GSM module 140 can receive downloaded software wirelessly and remotely, thereby avoiding the costly and time-consuming process of first securing the system 20 and downloading software by in-person processes.

As a second non-limiting example of configuring the control module 132 for other functions, the system 20 can be configured for two-way communication with other electronic devices. Referring now to FIG. 5, the control circuit board 57 includes suitable software to activate and control a communication module, shown schematically at 142. The communications module includes a radio transmitter 144, a radio receiver 146 a microphone 148 and a speaker 150. In operation, the microphone 148 is configured to convert voices into electrical signals, which are subsequently transmitted by the radio transmitter 144 via radio waves to a nearby cell tower. Incoming radio waves are received by the radio receiver 146 and converted into sound waves, which are subsequently broadcast by the speaker 150.

Advantageously, the use of two-way communication with other electronic devices facilitates communication of a person adjacent the system 20 with a person remote from the system 20. While the embodiment shown in FIG. 5 employs the use of the communications module 142, in other embodiments, the system 20 can incorporate other systems, mechanisms, devices and structures sufficient to enable two-way communication with other electronic devices.

As another non-limiting example of configuring the control module 132 for other functions, the circuit control board 57 can include software security features to deter hacking and other intrusive actions. It is contemplated that the software for the system 20 is updated routinely to include the latest security patches. It is further contemplated that the software for the system 20 is locked from external access and can only be unlocked with entry protocols such as personal identification numbers, fingerprints, patterns, voice-recognition, iris scanning, two-factor authentication processes, encryption, mobile virtual private networks (commonly referred to as a VPN) and the like. Advantageously, the use of software security features substantially reduces the likelihood of misappropriation of the system 20.

As another non-limiting example of configuring the control module 132 for other functions, the circuit control board 57 can include software to prevent removal of a deployed system 20 in certain instances. In a first example, the circuit control board 57 can include software to prevent removal of a deployed system 20 by a person having an age that is less than a legal driving age. In another example, the circuit control board 57 can include software to prevent removal of a deployed system 20 by a person having a suspended or revoked driver's license, or no valid driver's license. In another example, the circuit control board 57 can include software to prevent removal of a deployed system 20 by an impaired driver. Advantageously, the system 20 can be configured to prevent removal of a deployed system 20 by persons void of authorized use of a vehicle.

As discussed above and shown in FIG. 6, the setup and operation of the system 20 is described in a generally hands-on arrangement. It is further contemplated that the setup and operation can be accomplished with other arrangements, including for example, remote arrangements. In one non-limiting example, it is contemplated that the setup and operation of the system 20 can be accomplished with remote electronic devices, such as cellular phones, laptop and tablet-style computers and the like. In certain instances, the remote electronic devices can employ efficient, wireless communication formats, such as for example Bluetooth. The use of Bluetooth-style communication formats advantageously allows the setup and operation of the system with low power requirements.

Referring now to FIG. 5, the control circuit board 57 includes a barometric pressure/temperature/altitude sensor system 160 (hereafter "sensor system"). The sensor system 160 is in electrical communication with the control circuit board 57 and is configured to sense environmental conditions for barometric pressure, temperature and altitude, relative to sea level, of a deployed system 20. The sensor system 160 is further configured to communicate the sensed barometric pressure, temperature and altitude to the control circuit board 57. In response to the sensed altitude, the control circuit board can adjust the suction developed between the first and second suction assemblies 34, 42 and the windshield in a manner such that sufficient suction is developed. In the illustrated embodiment, the barometric pressure/temperature/altitude sensor system 160 is a precision sensor, model BMP085, manufactured and marketed by Bosch Sensortec GmbH, headquartered in Germany. However, in other embodiments, other sensor systems can be used, sufficient to sense environmental conditions and communicate the sensed environmental conditions to the control circuit board 57.

The principle and mode of operation of the violation enforcement system have been described in the illustrated embodiments. However, it should be noted that the violation enforcement system may be practiced otherwise than as specifically illustrated and described without departing from its scope.

What is claimed is:

1. A violation enforcement system configured to impair the view of a driver through a windshield of a vehicle, comprising:
    a plurality of covering assemblies, each of the covering assemblies having one or more suction assemblies configured for placement against a windshield of a vehicle;
    a pump assembly configured for pneumatic communication with the one or more suction assemblies, the pump assembly configured to develop a partial vacuum between the suction assemblies and the windshield;
    a release assembly configured for pneumatic communication with the one or more suction assemblies, the release assembly configured to actuate release of the suction assemblies from the windshield; and
    a GSM module configured to receive information from GPS satellites and then calculate the geographical position of the violation enforcement system, wherein the geographical position of the violation enforcement system obtained from the GSM module is displayed with geographical positions of other violation enforcement systems.

2. The violation enforcement system of claim 1, wherein the displayed positions of the violation enforcement systems facilitates development of an inspection route, wherein a plurality of deployed violation enforcement systems can be efficiently viewed for condition, damage and expiration.

3. The violation enforcement system of claim 1, wherein the GSM module is configured to employ assisted GPS technology.

4. The violation enforcement system of claim 1, wherein the GSM module is configured to receive a kill signal configured to render the violation enforcement system inoperative.

5. The violation enforcement system of claim 4, wherein rendering the violation enforcement system inoperative includes removing the partial vacuum formed between the suction assemblies and the windshield.

6. The violation enforcement system of claim 1, wherein a communication module is provided and configured for two-way communication with other electronic devices.

7. The violation enforcement system of claim 1, wherein the violation enforcement system includes an alarm assembly configured to detect movement or vibration of the system.

8. A violation enforcement system configured to impair the view of a driver through a windshield of a vehicle, comprising:
 a plurality of covering assemblies, each of the covering assemblies having one or more suction assemblies configured for placement against a windshield of a vehicle;
 a pump assembly configured for pneumatic communication with the one or more suction assemblies, the pump assembly configured to develop a partial vacuum between the suction assemblies and the windshield;
 a release assembly configured for pneumatic communication with the one or more suction assemblies, the release assembly configured to actuate release of the suction assemblies from the windshield; and
 a GSM module configured to receive information from GPS satellites and then calculate the geographical position of the violation enforcement system, wherein the GSM module is configured to receive software updates for a control circuit board, and wherein the control circuit board is configured to control the partial vacuum formed between the suction assemblies and the windshield.

9. The violation enforcement system of claim 8, wherein the control circuit board software includes security features configured to deter hacking and other software intrusive actions.

10. The violation enforcement system of claim 9, wherein the software security features include voice recognition entry protocols.

11. The violation enforcement system of claim 8, wherein the control circuit board software is configured to prevent removal of a deployed system by one or more persons void of authorized use of a vehicle.

* * * * *